United States Patent [19]

Kano et al.

[11] Patent Number: 4,810,098

[45] Date of Patent: Mar. 7, 1989

[54] PROCESS FOR PREPARING ONE-COMPONENT TYPE SEALANT

[75] Inventors: Koichi Kano, Hiratsuka; Takayuki Kabasawa, Shinagawa; Masamichi Danjo; Etuo Okada, both of Hiratsuka, all of Japan

[73] Assignee: The Yokohama Rubber Co., Ltd., Tokyo, Japan

[21] Appl. No.: 110,908

[22] Filed: Oct. 21, 1987

[30] Foreign Application Priority Data

Oct. 23, 1986 [JP] Japan .................................. 61-250745

[51] Int. Cl.⁴ ............................................. B01F 15/04
[52] U.S. Cl. ..................................... 366/162; 366/139; 366/348
[58] Field of Search ................. 366/150, 152, 154, 156, 366/160, 161, 162, 177, 182, 183, 348, 75, 139; 422/131, 133, 134, 135, 137, 138; 222/1, 55, 56, 57, 77; 264/101, 102; 425/203

[56] References Cited

U.S. PATENT DOCUMENTS

| | | | |
|---|---|---|---|
| 3,629,217 | 12/1971 | Balitrand et al. | 422/135 X |
| 3,704,100 | 11/1972 | Twilley et al. | 422/135 X |
| 4,316,875 | 2/1982 | Barth et al. | 422/135 X |
| 4,370,302 | 1/1983 | Suzuoka et al. | 422/131 X |
| 4,560,501 | 12/1985 | Minami et al. | 422/138 X |
| 4,679,498 | 7/1987 | Chaveron et al. | 366/75 X |

FOREIGN PATENT DOCUMENTS

1386686 3/1975 United Kingdom ................. 366/161

*Primary Examiner*—Harvey C. Hornsby
*Assistant Examiner*—Stephen F. Gerrity
*Attorney, Agent, or Firm*—Armstrong, Nikaido, Marmelstein & Kubovcik

[57] ABSTRACT

There is disclosed a process for preparing a one-component type sealant, comprising the steps of mixing powdery raw material such as prepolymer and additives admixed or not admixed with a predetermined amount of plasticizer in a mixer in a hermetically closed system, continuously degassing the mixed pasty material in a degassing line, and mixing the degassed mixture with catalyst admixed or not admixed with plasticizer.

4 Claims, 1 Drawing Sheet

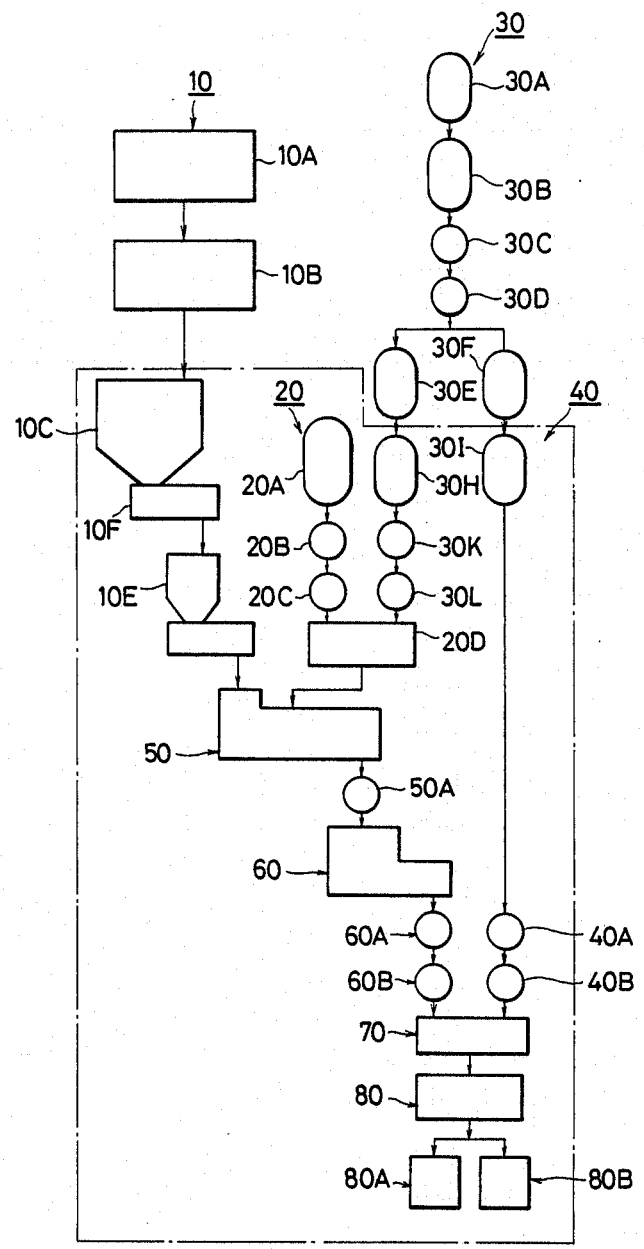

PROCESS FOR PREPARING ONE-COMPONENT TYPE SEALANT

BACKGROUND OF THE INVENTION

The present invention relates to a process for preparing a one-component type sealant, and more specifically to a process for preparing a one-component type sealant, which can be continuously and efficiently prepared without being affected by the environmental conditions of the manufacturing site while maintaining the level of properties of a product within a given range.

A process for preparing a moisture-curing one-component type sealant has heretofore been known as a process for preparing a one-component type sealant. This process comprises mixing a preliminarily dried powder (e.g., carbon black, calcium carbonate, or the like) with prepolymer, and mixing catalyst with the resulting mixture.

Since mixing is conducted with one mixer in the air, however, the process involves the following problems:

(a) the productivity is very poor, and the quality of the product is liable to be unstable due to moisture in the air, (b) the dispersion between batches is large and the loss in the preparation is large, and (c) much labor and long time are needed for cleaning the equipment.

SUMMARY OF THE INVENTION

The present invention has been made while paying attention to the above-mentioned problems of the conventional process. A first object of the invention is to provide a process for preparing a one-component type sealant which can be efficiently prepared without being affected by the environmental conditions of the manufacturing site by enabling a continuous preparation in a hermetically closed production line.

A second object of the present invention is to provide a process for preparing a one-component type sealant, which can minimize the dispersion of properties such as the storage stability and the viscosity and enables the equipment to be cleaned only in specified parts thereof at a given interval of period.

BRIEF DESCRIPTION OF THE DRAWINGS

The attached FIGURE is a block diagram of the process for preparing a one-component type sealant according to the present invention.

DETAILED DESCRIPTION OF THE PREFERRED EMBODIMENTS

An example of the present invention will now be described with reference to the FIGURE.

The FIGURE shows a block diagram of the process for preparing a one-component type sealant according to the present invention.

The process for preparing a one-component type sealant mainly involves a raw powdery material (e.g., carbon black or calcium carbonate as a reinforcing agent or an extender) feeding line 10, a prepolymer feeding line 20, a plasticizer feeding line 30, and a catalyst feeding line 40. Hermetically closed lines shielded from the outer atmosphere (an area surrounded by the dot-dash line) are constituted between storage tanks for the respective raw materials through filling machines.

The constitutions of respective lines will now be described. The raw powdery material feeding line 10 leads to a powder storage tank 10C through a powder drier 10A and a powder cooler 10B. The raw powdery material discharged from the powder storage tank 10C is fed through a screw feeder 10F and a powder feeder 10E to a mixer 50 after weighing a given amount of the material.

The procedure up to the storage of the above-mentioned powdery raw material in a storage tank 10C is as follows. The powdery raw material is preliminarily placed in a powder dryer 10A, wherein it is dried by steam heating and hot air supply while mixing it by stirring. It is then sent to a powder cooler 10B, wherein it is cooled with cooling water. The dried and cooled powder is stored in the powder storage tank 10C.

In a prepolymer feeding line 20, a given amount of prepolymer is stored in a prepolymer storage tank 20A, and fed through a pump 20B, a flowmeter 20C, and a stationary mixer 20D to a mixer 50 which is used for mixing both the powdery raw material and the prepolymer.

In a plasticizer feeding line 30, plasticizer (e.g., dialkyl phthalate or the like) is heated with steam, dehydrated by stirring under reduced pressure, and cooling in a dehydration tank 30A. It is then sent to a storage tank 30B, wherein it is stored.

The stored plasticizer is then metered into preparation tanks 30E and 30F by using a pump 30C and a flowmeter 30D.

A predetermined amount of additives is fed to the above-mentioned preparation tank 30E, wherein stirring is conducted under reduced pressure. Then, the resulting mixture is sent to a storage tank 30H, wherein it is stored.

A predetermined amount of catalyst (e.g., comprising an amine or the like) is fed to the preparation tank 30F, wherein stirring is conducted under reduced pressure. Then, the resulting mixture is sent to a storage tank 30I, wherein it is stored.

The above-mentioned plasticizer, additives and catalyst are kept at a constant temperature in storage tanks 30B, 30H and 30I by circulation of temperature-controlling warm water.

The reasons why minute amounts of the additives and the catalyst are added to the plasticizer to prepare master batches before they are fed to mixers 50 and 70 as described above are that uniform mixing and dispersion of the additives and the catalyst in mixers 50 and 70 are made possible thereby and that the metering accuracy is improved.

Where a plurality of preparation tanks 30F and storage tanks 30I are provided, a plurality of sealants having different properties can be prepared while commonly using main equipments.

The case where the above-mentioned raw materials are continuously mixed in a hermetically closed apparatus will now be described.

The materials stored in the prepolymer storage tank 20A and the additives storage tank 30H are sent to a stationary mixer 20D under pressure while metering them with the pump 20B and the flowmeter 20C, and the pump 30K and flowmeter 30L, respectively. The materials are mixed together in the stationary mixer 20D and fed to a mixer 50.

Simultaneously, the powder stored in the powder storage tank 10C is fed in a predetermined amount through a screw feeder 10F and a powder feeder 10E to a mixer 50, wherein it is mixed with the materials fed from the stationary mixer. If the temperature rises during mixing due to the presence of minute amount of water remaining in the raw powdery material, the reaction of prepolymer is promoted. Thus, mixing is conducted while cooling in a manner such that homogeneous pasty material can be obtained as fast as possible.

The mixed pasty material is sent under pressure through a pump 50A into a degassing apparatus 60, wherein the pasty material is degassed under reduced pressure.

In this degassing apparatus 60, the pasty material is degassed under reduced pressure at about 40° C. Thus, air contained in the pasty material is efficiently removed. By heating the pasty material, the load and pressure loss in starting due to the lowering in the temperature of the material during stoppage is decreased, and the extent of degassing is improved.

The sealant which is prepared in a state of air being incorporated thereinto is not preferred from the viewpoint of properties required of the product and stability of the quality thereof.

The material thus degassed is metered through a pump 60A and a flowmeter 60B into a mixer 70 and then a stationary mixer 80. The catalyst stored in the storage tank 30I is metered through a pump 40A and a flowmeter 40B into the mixer 70 and then the stationary mixer 80, wherein the catalyst is mixed with and dispersed into the paste.

If the catalyst is fed to the system in the first step, there arises a fear that the prepolymer is hardened under the pressure of moisture in the air in any apparatus and peeled pieces of a hardened product is incorporated into the materials, because the hardening reaction is expedited from the time when it is fed to the system. In view of this, the catalyst is fed to the last mixer to be mixed with the pasty material which is in the most stable state because it is free from air by degassing.

The mixed material is filled in a drum with a filling machine 80A or 80B.

It is preferred that the plasticizer and the catalyst be mixed in amounts of 10 to 50% and 0.01 to 1%, respectively, based on 100% of the powder and the prepolymer.

When the amount of the plasticizer is less than 10%, the hardness is so high that the resulting product is unsuitable as the sealant. When it exceeds 50%, the hardness is too low. Thus, the amount of the plasticizer is preferably in the range of 10 to 50%.

When the amount of the catalyst is less than 0.01%, the reaction in practical use is slow. When it exceeds 1%, the pot life is short and the storage stability is deteriorated. Thus, such an amount is not preferred from the viewpoint of work and quality.

Therefore, the catalyst is used preferably in an amount of 0.01 to 1%.

According to the present invention, a one-component type sealant is prepared by continuous metering, mixing and degassing of the materials in hermetically closed equipments as described above, therefore the following excellent results are brought about.

(a) The sealant can be prepared irrespective of environmental conditions of the manufacturing site. The dispersion of properties such as storage stability and viscosity can be remarkably decreased.

(b) No loss due to adhesion of materials to a mixer is caused.

(c) Cleaning of equipment which is necessary in every batch in the case of the conventional process becomes unnecessary, leading to improved workability.

(d) The safety and productivity are improved by automatic operations.

We claim:

1. A continuous process for preparing a moisture-curable, one-component type sealant wherein the entire process is performed in a hermetically closed system, comprising the steps of continuously feeding a dry powder, a dry prepolymer and a dry plasticizer to respective storage tanks in said hermetically closed system; continously feeding a predetermined amount of the powder, a predetermined amount of the prepolymer, based on the amount of the powder, a predetermined amount of the plasticizer, based on the amount of powder and prepolymer, from said storage tanks, to a mixing and degassing zone to continuously mix and degas the mixture of powder, prepolymer and plasticizer; continuously adding with mixing to the degassed mixture a predetermined amount, based on the amount of the powder and the prepolymer, of a catalyst; and continuously discharging the resulting mixture to a filling means.

2. A continuous process for preparing a moisture-curable, one-component type sealant wherein the entire process is performed in a hermetrically closed system, comprising the steps of continuously feeding a predetermined amount of dry powder, a predetermined amount, based on the powder, of a dry prepolymer, and a predetermined amount, based on the amount of the powder and the prepolymer, of a first portion of a dry plasticizer, to a first mixer in said hermetically closed system to form a pasty mixture; continuously degassing the pasty mixture in the first mixer under reduced pressure; continuously passing the degassed pasty mixture to a second mixer; mixing a predetermined amount of catalyst, based on the amount of powder and the prepolymer, with a predetermined amount, based on the powder and the prepolymer, of a second portion of plasticizer, and continuously feeding the mixture to the second mixer; mixing the mixture of catalyst and plasticizer with the degassed pasty mixture in the second mixer; and discharging the resultant mixture in the second mixer to a filling means.

3. A process according to claim 2, wherein the plasticizer is dehydrated by heating under reduced pressure.

4. A process according to claim 3, wherein the first portion of the plasticizer contains an additive.

* * * * *